United States Patent [19]

Habiger

[11] 3,908,374

[45] Sept. 30, 1975

[54] HYDROSTATIC DRIVE ARRANGEMENT

[75] Inventor: Cyril W. Habiger, Joliet, Ill.

[73] Assignee: Caterpillar Tractor Company, Peoria, Ill.

[22] Filed: Aug. 28, 1974

[21] Appl. No.: 501,209

[52] U.S. Cl. .................. 60/420; 60/468; 60/486; 137/115; 180/6.48; 60/421
[51] Int. Cl.² ........................................ F15B 11/22
[58] Field of Search ............ 60/420, 421, 468, 486; 137/115; 180/6.48

[56] References Cited
UNITED STATES PATENTS
2,941,609  6/1960  Bowers et al. ..................... 60/421
3,795,109  3/1974  Bojas et al. ........................ 60/421

*Primary Examiner*—Edgar W. Geoghegan
*Attorney, Agent, or Firm*—Ralph E. Walters

[57] ABSTRACT

A hydrostatic drive arrangement for a vehicle providing synchronized rotation of a pair of output drive shafts including a pair of transmissions each having a closed loop hydraulic system hydraulically interconnecting a variable displacement pump and a hydraulic motor, and a pressure responsive hydraulic synchronizing valve disposed between the hydraulic systems and normally open to permit restricted interflow of fluid between the hydraulic systems with the valve being responsive to fluid pressure in one of the hydraulic systems to block flow therethrough when the fluid pressure in the one hydraulic system exceeds a predetermined value.

7 Claims, 1 Drawing Figure

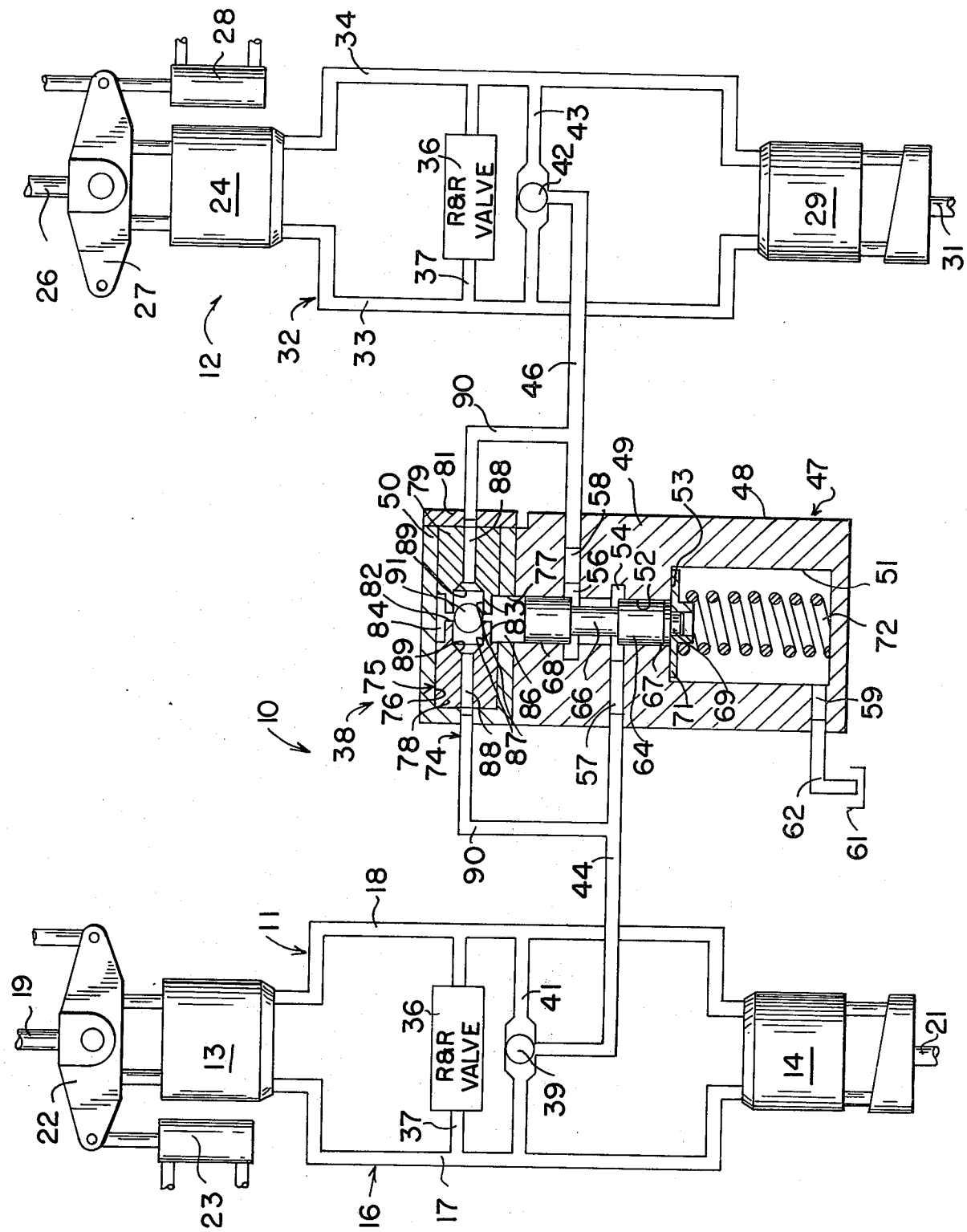

HYDROSTATIC DRIVE ARRANGEMENT

BACKGROUND OF THE INVENTION

Hydrostatic transmissions are employed for propelling a variety of vehicles including farm tractors, lift trucks and track type vehicles. The track type vehicles commonly have a matching pair of hydrostatic transmissions individually driving a pair of tracks mounted on opposite sides of the vehicle. With such arrangements the vehicle has a tendency to veer from a straight course due to slightly different pump outputs and/or slightly different leakage rates of the hydraulic motors. This is not usually a problem during heavy workload operation since it is difficult to detect internal system veering from that caused by uneven track loading and track slippage. However, when the vehicle is being roaded to and from the job site or when the vehicle is being driven under light loads during a portion of its operating cycle, it is desirable for the vehicle to follow a straight path without continual steering corrections by the operator. This requires precise synchronization of the motor speeds.

Previous attempts to synchronize the motor speeds have included mechanically linking the swash plates of the pumps together to provide equal output. However, such linkage has not been entirely satisfactory since the angle of the swash plates must be synchronized within about one-tenth of a degree through the full range of movement. Also the pumps and motors may wear at slightly different rates thereby necessitating frequent adjustment of the synchronizing linkage.

OBJECTS OF THE INVENTION

Accordingly, an object of this invention is to provide an improve hydrostatic drive arrangement for a vehicle which permits normal unrestricted synchronized rotation of its output drive shafts.

Another object of this invention is to provide such an improved hydrostatic drive arrangment which automatically affords independent operation of the output drive shafts in selective operating conditions.

Other objects and advantages of the present invention will become more readily apparent upon reference to the accompanying drawing and following description.

BRIEF DESCRIPTION OF THE DRAWING

The sole FIGURE is a schematic drawing with valve portions thereof shown in section depicting a hydrostatic drive arrangement embodying the principles of the present invention.

DESCRIPTION OF THE PREFERRED EMBODIMENT

Referring more particularly to the drawing, a hydrostatic drive arrangement embodying the principles of the present invention is generally indicated by the refference numeral 10 and adapted for propelling a track type vehicle, not shown. The hydrostatic drive arrangement includes a pair of variable speed, hydrostatic transmissions 11 and 12 with the transmission 11 having a variable displacement, overcenter pump 13 hydraulically connected to a hydraulic motor 14 through a closed loop hydraulic system 16 which includes a pair of motor conduits 17 and 18. The pump has an input shaft 19 commonly connected to an engine, not shown, while the motor has an output shaft 21 adapted to drive one of a pair of tracks, not shown. A pivotal swash plate 22 of the pump is controlled by a double acting cylinder 23 in the usual manner.

The transmission 12 is substantially identical to the transmission 11 and includes a pump 24 having an input shaft 26 and a swash plate 27, an actuating cylinder 28, a hydraulic motor 29 having an output shaft 31 adapted to drive the other track of the pair of tracks, and a closed loop hydraulic system 32 having a pair of motor conduits 33 and 34. Each of the hydraulic systems has a replenishing and relief valve 36 in a conduit 37 extending between the motor conduits to replenish fluid lost from the hydraulic system due to leakage and to limit maximum pressure in the hydraulic system in the usual manner.

A synchronizing system 38 is interconnected between the hydraulic systems 16 and 32 of the transmissions 11 and 12, respectively, and includes a shuttle valve 39 in a conduit 41 extending between the motor conduits 17 and 18 in parallel relation to the motor 14. Similarly, a shuttle valve 42 is located in a conduit 43 extending between the motor conduits 33 and 34. The shuttle valves are interconnected through a pair of lines 44 and 46, and a synchronizing valve 47 disposed therebetween.

The synchronizing valve 47 includes a composite valve body 48 formed by a pair of body members 49 and 50. A pair of concentric bores 51 and 52 are formed in the body member 49 with the bore 51 terminating at a shoulder 53. A pair of axially spaced annuli 54 and 56 are formed in the bore 52 and individually communicate with the lines 44 and 46, respectively, through a pair of ports 57 and 58 formed in the body member 49. A drain passage 59 is formed in the body member and connects the bore 51 with a tank 61 through a drain line 62.

A valve spool 64 is slidably disposed in the bore 52 and has an annular groove 66 formed therein intermediate its ends 67 and 68. A reduced diameter portion 69 is formed on the end 67 and engages a spring seat plate 71 disposed in the bore 51. A spring 72 is disposed in the bore 51 and resiliently urges the plate into abutment with the shoulder 53, thereby positioning the valve spool in the open position such that the annular groove 66 establishes restricted communication between the annuli 54 and 56.

An auxiliary flow path 74 connects the lines 44 and 46 with the bore 52 at the end 68 of the valve spool 64 and includes a shuttle check valve generally indicated by the reference numeral 75 housed within the body member 50. A bore 76 is formed in the member 50 substantially normal to a bore 77 which is concentric with and opens into the bore 52 of the body member 49. A pair of inserts 78 and 79 are fitted in the bore 76 and retained therein by a cover 81 suitably secured to the member 50. A space 82 is provided between the inner ends of the inserts, each of which has a reduced diameter portion 83 formed thereon defining an annulus 84 which communicates the space with an actuating chamber 86 formed adjacent to the end 68 of the valve spool 64. A bore 87 extends outwardly from the inner end of each insert and connects with a smaller coaxial passage 88 forming a valve seat 89 therebetween. The lines 44 and 46 individually communicate with the passages 88 of the inserts 78 and 79, respectively, through a pair of branch lines 90. A ball valve 91 is loosely contained in the bores 87 of the inserts.

OPERATION

While the operation of the present invention is believed clearly apparent from the foregoing description, further amplification will subsequently be made in the following brief summary of such operation. The forward movement of the vehicle is obtained by selectively directing fluid simultaneously to the head end of the cylinders 23 and 28 for simultaneously pivoting the swash plates 22 and 27 of the pumps 13 and 24, respectively. This causes the pumps to transmit substantially equal volumes of fluid through the conduits 18 and 33 to drive the respective motors 14 and 29 in a forward direction.

The shuttle valve 39 is shifted by fluid pressure in the conduits 18 and 41 to block fluid flow to the conduit 17 and to communicate the conduit 18 with the line 44. Likewise, the shuttle valve 42 establishes fluid communication between the conduit 33 and the line 46 while blocking fluid communication between the conduits 33 and 34. The pressurized fluid in lines 44 and 46 is also communicated through the auxiliary flow path 74 with the shuttle check valve 75 being responsive to the highest pressure in the lines 44 and 46. More specifically, the ball valve 91 is shifted against the appropriate valve seat 89 to block communication to the line 44 or 46 having the lower fluid pressure and to communicate the higher pressure line with the chamber 86 above the valve spool 64.

When the vehicle is operated under relatively low load conditions and fluid pressure in both conduits 18 and 33 is below a predetermined pressure value, the force acting on the end of the valve spool 64 is insufficient to move the spool against the bias of the spring 72. Thus, the synchronizing valve 47 remains open and provides a flow path therethrough by way of the ports 57 and 58, annuli 54 and 56 and the restricted space between the annular groove 66 and the bore 52. This permits limited communication between the motor conduits 18 and 33 automatically to compensate for slight variations in fluid flow to the hydraulic motors 14 and 29 so that the fluid pressure equalizes in the motor conduits and the hydraulic motors run at the same speed. For example, should the fluid output of the pump 13 be slightly greater than that of the pump 24 then the motor 14 would tend to do more of the work than the motor 29. Thus, the pressure in the conduit 18 would be higher creating a pressure differential between the conduits 18 and 33 through the synchronizing system 38 resulting in a flow of fluid from the conduit 18 through the synchronizing system to the conduit 33, thereby equalizing the pressure therein. Likewise, if the fluid leakage in the hydraulic transmission 11 is slightly greater than the fluid leakage in the hydraulic transmission 12, then some of the fluid from the transmission 12 is transferred through the synchronizing system to the conduit 18 to equalize the pressures in the transmissions so that the hydraulic motors run at the same speed and equally share the load.

A deficiency of fluid in the low pressure conduits of the hydrostatic transmission 11 or 12 is replenished by the respective replenishing and relief valve 36 while excess fluid in the low pressure conduits is exhausted to the tank through the respective replenishing and relief valve in the usual manner.

When the vehicle is in a working mode of operation, such that the resisting force on the hydraulic motors 14 and 29 is moderate to heavy, the fluid pressure in the conduits 18 and 33 and lines 44 and 46 will be above the predetermined pressure valve. Such pressure is directed through auxiliary flow path 74 as previously described into the chamber 86 where it acts on the end of the valve spool 64 forcing it downward overcoming the force of the spring 72. In so doing, the valve spool blocks communication between the annuli 54 and 56, thereby blocking intercommunication between the conduits 18 and 33 such that the hydraulic motors operate independently of each other. However, slightly unequal motor speeds are not objectionable under these conditions since the operator is normally continually altering track speeds to compensate for track slippage and load conditions.

Steering of the vehicle is accomplished by increasing or decreasing the output flow of the appropriate one of the pumps 13 or 14 while maintaining constant fluid output from the other pump. In the work mode of the vehicle, the valve spool 64 of the synchronizing valve 47 is normally in the fluid blocking position and is substantially unaffected by steering maneuvers since the shuttle valve 75 automatically responds to the highest pressure in the lines 44 and 46 to maintain fluid pressure in the chamber 86.

When a steering maneuver is initiated with the synchronizing valve 47 in the open condition, the resultant initial increase of fluid flow through the restricted opening between the annular groove 66 of the valve spool 64 and the annulus 56 maintains a back pressure in the respective line 44 or 46. Such pressure is transmitted through the auxiliary flow path 74 to the chamber 86 where it forces the valve spool 64 against the bias of the spring 72 to block communication through the lines 44 and 46. In this manner, maximum power is applied to the driving motor generating the steering maneuver.

During reverse operation of the vehicle, output of the pumps 13 and 24 is transmitted through the conduits 17 and 34 to the respective motors 14 and 29 while the fluid exhausted from the motors is returned to the pump through the respective conduits 18 and 33. The shuttle valves 39 and 42 are automatically shifted by the fluid pressure in the conduits 17 and 34, respectively, to block communication to the conduits 18 and 33 while establishing communication between the conduits 17 and 34 and the lines 44 and 46, respectively. The operation of the synchronizing valve 47 is as previously described in conjunction with the forward operation to provide synchronized motor speeds in light duty vehicle operations, individual motor operation in moderate to heavy vehicle operations, and maximum power to the driving motor during a steering maneuver.

In view of the foregoing, it is readily apparent that the structure of the present invention provides an improved hydrostatic drive arrangement which hydraulically interconnects a pair of transmissions through a synchronizing system for interflow of fluid therebetween when the fluid pressure is below a predetermined value. Thus the fluid pressure in the transmissions is equalized providing synchronized rotation of the output drive shafts of the transmissions. The synchronizing system is responsive to fluid pressure in the transmissions automatically to block flow therethrough as the pressure value in either transmission increases above a predetermined value. This provides independent operation of the output drive shafts for maximum utilization of the output of the transmissions during high load conditions.

While the invention has been described and shown with particular reference to the preferred embodiment, it will be apparent that variations might be possible that would fall within the scope of the present invention which is not intended to be limited except as defined in the following claims.

What is claimed is:

1. A hydrostatic drive arrangement for a vehicle providing synchronized rotation of a pair of output drive shafts, comprising;
a pair of variable speed hydrostatic transmissions each of which has a positive displacement pump, a hydraulic motor, and a closed loop hydraulic system interconnecting said pump and said motor for communicating fluid therebetween; and
hydraulic synchronizing means interconnected between said hydraulic systems of said transmissions normally permitting interflow of fluid between said hydraulic systems for synchronizing the output speeds of said transmission when the fluid pressure in said hydraulic systems is below a predetermined value, said synchronizing means being responsive to fluid pressures in said hydraulic systems to block interflow therebetween when the fluid pressure in one of said hydraulic systems exceeds said predetermined value.

2. The hydrostatic drive arrangement of claim 1 wherein said synchronizing means includes a synchronizing valve having means providing a passage therethrough, a valve member operatively associated with said passage, and a spring resiliently urging said valve member to an open position permitting fluid flow through the synchronizing valve.

3. The hydrostatic drive arrangment of claim 2 wherein said synchronizing valve includes means providing an auxiliary flow path for transmitting fluid under pressure from said one hydraulic system to said valve member for moving it to a closed position against the bias of said spring for blocking fluid flow through said passage when the fluid pressure in said one hydraulic system exceeds said predetermined value.

4. The hydrostatic drive system of claim 3 wherein said passage means includes a bore formed in said valve and a pair of ports individually communicating said bore with said closed hydraulic systems.

5. The hydrostatic drive arrangement of claim 4 wherein said valve member is a valve spool slidably disposed in said bore and having an annular groove formed therein, said valve spool forming an actuating chamber in said bore in communication with said auxiliary flow path.

6. The hydrostatic drive arrangement of claim 5 wherein said auxiliary flow path communicates with both of said hydraulic systems, and includes shuttle check valve means responsive to fluid pressure in said one hydraulic system for communicating said one hydraulic system with said chamber and blocking fluid flow through said auxiliary flow path to the other of said hydraulic systems.

7. The hydrostatic drive arrangement of claim 6 wherein each of said closed hydraulic systems includes a pair of conduits individually interconnecting said pump and said motor, said pump being a variable displacement, overcenter reversible flow pump for selectively transmitting fluid through one of said conduits, and a shuttle check valve disposed between said conduits is parallel with said motor and responsive to fluid pressure in said one conduit for communicating said one conduit with said hydraulic synchronizing means.

* * * * *

UNITED STATES PATENT AND TRADEMARK OFFICE
CERTIFICATE OF CORRECTION

PATENT NO. : 3,908,374
DATED : September 30, 1975
INVENTOR(S) : Cyril W. Habiger It is certified that error appears in the above-identified patent and that said Letters Patent are hereby corrected as shown below:

On the Title Page, Item [73], change the spelling of the assignee's corporate name from "Caterpillar Tractor Company" to ---Caterpillar Tractor Co.---.

Signed and Sealed this ninth Day of March 1976

[SEAL]

Attest:

RUTH C. MASON
Attesting Officer

C. MARSHALL DANN
Commissioner of Patents and Trademarks